Feb. 21, 1928.

R. RÜDENBERG 1,659,706

MEANS FOR SUPPRESSING HARMONICS OF THE TRANSMITTING LINE FREQUENCY

Filed Aug. 25, 1926

WITNESS

INVENTOR
REINHOLD RÜDENBERG
BY
his ATTORNEYS

Patented Feb. 21, 1928.

1,659,706

UNITED STATES PATENT OFFICE.

REINHOLD RUDENBERG, OF BERLIN-GRUNEWALD, GERMANY, ASSIGNOR TO SIEMENS-SCHUCKERTWERKE GESELLSCHAFT MIT BESCHRANKTER HAFTUNG, OF SIEMENS-STADT, NEAR BERLIN, GERMANY, A CORPORATION OF GERMANY.

MEANS FOR SUPPRESSING HARMONICS OF THE TRANSMITTING LINE FREQUENCY.

Application filed August 25, 1926, Serial No. 131,525, and in Germany August 28, 1925.

My invention relates to an arrangement or system for the suppression of the currents of the third harmonic of the line frequency, at the transformers of high-tension lines with earthed neutral point. The earthing or grounding of high-tension lines has the well known advantage that the voltage of the overhead line to earth does not rise even at a single-phase short circuit which is the case to a considerable extent with overhead lines the neutral of which is not earthed. Inasmuch as in high-tension lines with 220,000 volts between adjacent phases in polyphase systems or even higher voltages the insulation causes the main troubles, the earthing of the neutral point proves absolutely necessary for such high voltages.

Grounded high-tension lines have on the other hand the disadvantage that they render possible the development of capacity currents of the third harmonic frequency between the high-tension line and earth. These superposed currents have in the first instance an unfavorable influence upon the voltage of the overhead line and their earth currents are a source of trouble for adjacent telegraph and telephone lines.

For the suppression of the currents of the third harmonic of the line frequency at the transformers of the high-tension line delta windings are provided in the circuit in which condensers are connected which reduce the self-induction of the delta circuit for the currents of the third harmonic. It is known that a winding connected in delta acts as short-circuit winding upon the currents of the third harmonic frequency. This action is not perfect, however, since the delta winding still possesses a considerable resistance owing to its leakage inductance particularly for the third harmonics. This inductive reactance is reduced or even totally eliminated by the insertion of condensers. In this way the short-circuit effect of the delta winding upon the currents of the third harmonic frequency is increased. The condensers may be connected in the secondary winding of the transformer, but a special tertiary delta winding may equally well be provided.

Figure 1:
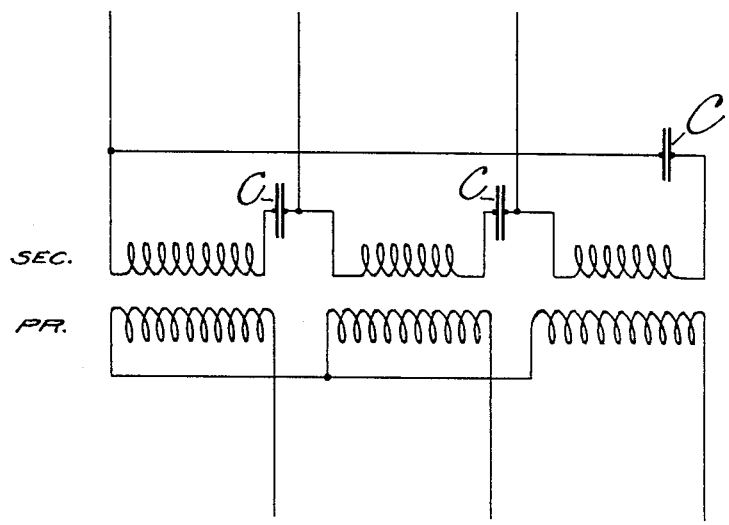
Figure 2:
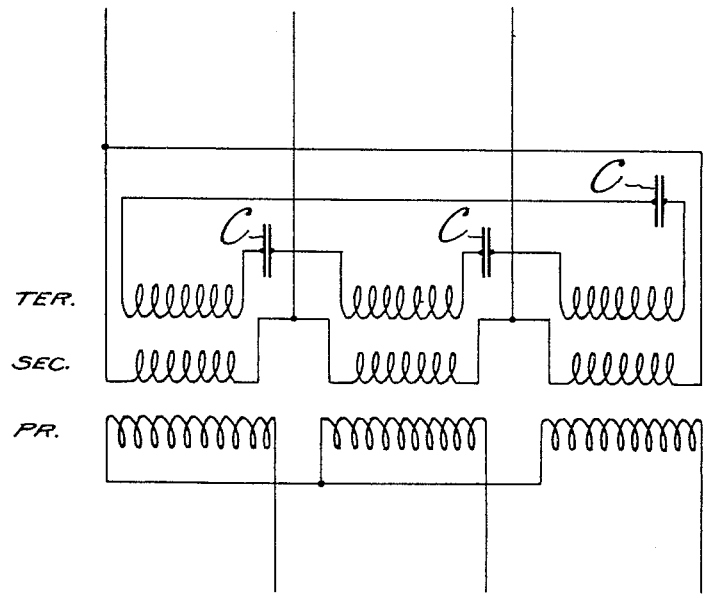

In the accompanying drawings two wiring diagrams are shown, Fig. 1 representing the condensers in the delta-connected secondary and Fig. 2 representing the condensers located in a tertiary winding.

In Figs. 1 and 2, Pr. represents the star-connected primary winding, and Sec. the delta-connected secondary winding and in Fig. 2 Ter. represents the tertiary winding. The condensers are denoted in each figure with C.

It will be understood that various modifications will suggest themselves to those skilled in the art and I desire to include all such modifications in the following claims which shall be construed in the light of the state of the art only.

I claim as my invention:—

1. In the system for suppressing currents of the third harmonic of the line frequency at the transformers of high-tension lines with earthed neutral point, windings connected in a delta circuit, and condensers in said circuit of such dimensions that they reduce the self-induction of the delta circuit for the currents of the third harmonic.

2. In the system for suppressing currents of the third harmonic of the line frequency at the transformers of high-tension lines with earthed neutral point, auxiliary windings connected in a delta circuit and being disposed on the transformers and condensers in said circuit of such dimensions that they reduce the self-induction of the delta circuit for the currents of the third harmonic.

In testimony whereof I affix my signature.

REINHOLD RÜDENBERG.